US011905682B2

(12) United States Patent
Tanaka et al.

(10) Patent No.: US 11,905,682 B2
(45) Date of Patent: Feb. 20, 2024

(54) WHEEL LOADER

(71) Applicant: HITACHI CONSTRUCTION MACHINERY CO., LTD., Tokyo (JP)

(72) Inventors: Tetsuji Tanaka, Abiko (JP); Masaki Nukii, Ushiku (JP); Keisuke Naitou, Kobe (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 539 days.

(21) Appl. No.: 17/271,743

(22) PCT Filed: Dec. 25, 2019

(86) PCT No.: PCT/JP2019/050791
§ 371 (c)(1),
(2) Date: Feb. 26, 2021

(87) PCT Pub. No.: WO2020/194953
PCT Pub. Date: Oct. 1, 2020

(65) Prior Publication Data
US 2021/0317637 A1     Oct. 14, 2021

(30) Foreign Application Priority Data

Mar. 25, 2019   (JP) ................................. 2019-057205

(51) Int. Cl.
*E02F 9/22*    (2006.01)
*E02F 3/84*    (2006.01)

(52) U.S. Cl.
CPC .............. *E02F 9/2253* (2013.01); *E02F 3/84* (2013.01)

(58) Field of Classification Search
CPC ...... B60W 10/00; B60W 10/11; B60W 10/30; B60Y 2200/415; E02F 3/84; E02F 9/2066;

(Continued)

(56) References Cited

U.S. PATENT DOCUMENTS 7,128,678 B2 * 10/2006 Dourra ................ F16H 61/0213
475/123
8,380,408 B2 * 2/2013 Hyodo .................. E02F 9/2253
701/64

(Continued)

FOREIGN PATENT DOCUMENTS

CN         101529128 A    9/2009
EP           1624231 A2    2/2006

(Continued)

OTHER PUBLICATIONS

International Search Report of PCT/JP2019/050791 dated Feb. 4, 2021.

*Primary Examiner* — Jeff A Burke
*Assistant Examiner* — Blake A Wood
(74) *Attorney, Agent, or Firm* — Mattingly & Malur, PC (57) ABSTRACT

Provided is a wheel loader capable of automatically decreasing vehicle speed without making an operator feel discomfort during a loading operation. A wheel loader 1 mounted with a torque converter type traveling drive system comprises a controller 5 configured to control shifting of a transmission 32. When a vehicle body travels forward at vehicle speed corresponding to a second speed stage set greater by one speed stage than the lowest speed stage of the transmission 32 while operating the lift arm 21 upwardly, the controller 5 sets, as a gear ratio of the transmission 32, an intermediate gear ratio between a gear ratio corresponding to the second speed stage and a gear ratio corresponding to a first speed stage, and outputs a signal for selecting a combination of a plurality of gears corresponding to the set gear ratio to each first to fifth solenoid control valves 32A to 32E.

3 Claims, 9 Drawing Sheets

(58) Field of Classification Search
CPC ...... E02F 9/2079; E02F 9/2253; F16H 59/50; F16H 59/70
See application file for complete search history.

(56) References Cited

U.S. PATENT DOCUMENTS

| | | | |
|---|---|---|---|
| 8,423,247 B2 * | 4/2013 | Hyodo | E02F 9/2083 |
| | | | 290/40 C |
| 10,647,320 B2 * | 5/2020 | Carlsson | B60W 30/19 |
| 2007/0150151 A1 * | 6/2007 | Brattberg | F16H 61/0213 |
| | | | 701/51 |
| 2011/0004378 A1 | 1/2011 | Saito | |
| 2015/0006010 A1 * | 1/2015 | Ito | E02F 9/2235 |
| | | | 903/930 |

FOREIGN PATENT DOCUMENTS

| | | |
|---|---|---|
| JP | 5204837 B2 | 6/2013 |
| JP | 2018-508714 A | 3/2018 |
| JP | 2018-532634 A | 11/2018 |
| WO | 2014/175026 A1 | 10/2014 |

* cited by examiner

WHEEL LOADER

TECHNICAL FIELD

The present invention relates to a wheel loader mounted with a torque converter type traveling drive system.

BACKGROUND ART

During a loading operation, since a wheel loader travels forward toward a dump truck while raising a lift arm, it is necessary to increase rotation speed of a hydraulic pump to increase a flow rate of hydraulic oil to be supplied to the lift arm while traveling at low speed. Accordingly, the operator needs to perform a special operation of stepping on an accelerator pedal and a brake pedal at the same time.

For example, Patent Literature 1 discloses a wheel loader including a torque converter type traveling drive system configured to transmit drive force output from an engine to wheels via a modulation clutch, a torque converter, a transmission, and an axle. In the case of the wheel loader according to Patent Literature 1, when a controller detects that a loading operation using a lift arm is being performed, the clutch pressure of the modulation clutch is decreased to slide the modulation clutch. Thus, the vehicle speed can be suppressed even if the operator does not step on a brake pedal, thereby reducing loss of power due to the brake and improving work efficiency.

CITATION LIST

Patent Literature

Patent Literature 1: JP-B-5204837

SUMMARY OF INVENTION

Technical Problem

However, since the wheel loader according to Patent Literature 1 is configured to slide the modulation clutch, the modulation clutch is easily worn and the durability thereof is concerned. Accordingly, it can be considered to shift down a speed stage of the transmission. Generally, a torque converter drive type wheel loader is equipped with a transmission having four or five speed stages, and the second speed stage is set during a loading operation while the first speed stage which is lower than second speed stage is set during an operation requiring traction force such as excavation or hill climbing. With this configuration, by shifting the speed stage from the second speed stage to the first speed stage during the loading operation, it is possible to reduce the vehicle speed without using a brake. However, since the first speed stage is provided for increasing the traction force, the vehicle speed becomes too slow at the first speed stage. In addition, since difference between the second speed stage and the first speed stage is large, there is a possibility of making the operator feel discomfort at the time of shifting the transmission.

In view of the above, an object of the present invention is to provide a wheel loader capable of automatically decreasing vehicle speed without making an operator feel discomfort during a loading operation.

Solution to Problem

In order to achieve the object above, the present invention provides a wheel loader comprising: a vehicle body having a plurality of wheels; a working device having a lift arm which is mounted rotatably in a vertical direction with respect to the vehicle body; an engine mounted on the vehicle body; a torque converter configured to amplify torque transmitted from the engine; a transmission configured to control a combination of a plurality of gears by means of a plurality of solenoid control valves so as to change and transmit the amplified torque output from the torque converter to the plurality of wheels; a forward/backward switching device configured to switch forward movement and backward movement of the vehicle body; a speed stage selection device configured to select a speed stage of the transmission; a traveling state sensor configured to detect a traveling state of the vehicle body; an operation state sensor configured to detect an operation state of the lift arm; and a controller configured to generate a control signal for selecting the combination of the plurality of gears to obtain a gear ratio corresponding to the selected speed stage based on a switching signal output from the forward/backward switching device and the speed stage selected by the speed stage selection device, and output the control signal to the plurality of solenoid control valves so as to control the transmission, wherein the controller is further configured to: in a case where the vehicle body is traveling forward at vehicle speed corresponding to a speed stage set greater by one speed stage than a lowest speed stage of the transmission, as well as in a case where the operation state of the lift arm detected by the operation state sensor is an operation in an upward direction, based on the switching signal output from the forward/backward switching device, the traveling state of the vehicle body detected by the traveling state sensor, and the speed stage selected by the speed stage selection device, output, to the plurality of solenoid control valves, a signal for selecting the combination of the plurality of gears corresponding to an intermediate gear ratio which is between a gear ratio corresponding to the speed stage set greater by one speed stage than the lowest speed stage and a gear ratio corresponding to the lowest speed stage.

Advantageous Effects of Invention

According to the present invention, it is possible to automatically decrease vehicle speed without making an operator feel discomfort during a loading operation. The problems, configurations, and effects other than those described above will be clarified by explanation of the embodiment below.

DESCRIPTION OF EMBODIMENTS

Hereinafter, an overall configuration and operations of a wheel loader according to an embodiment of the present invention will be described with reference to FIG. 1 to FIG. 3.

<Overall Configuration of Wheel Loader 1>

Firstly, an overall configuration and operations of a wheel loader 1 will be described with reference to FIG. 1.

Figure 1:
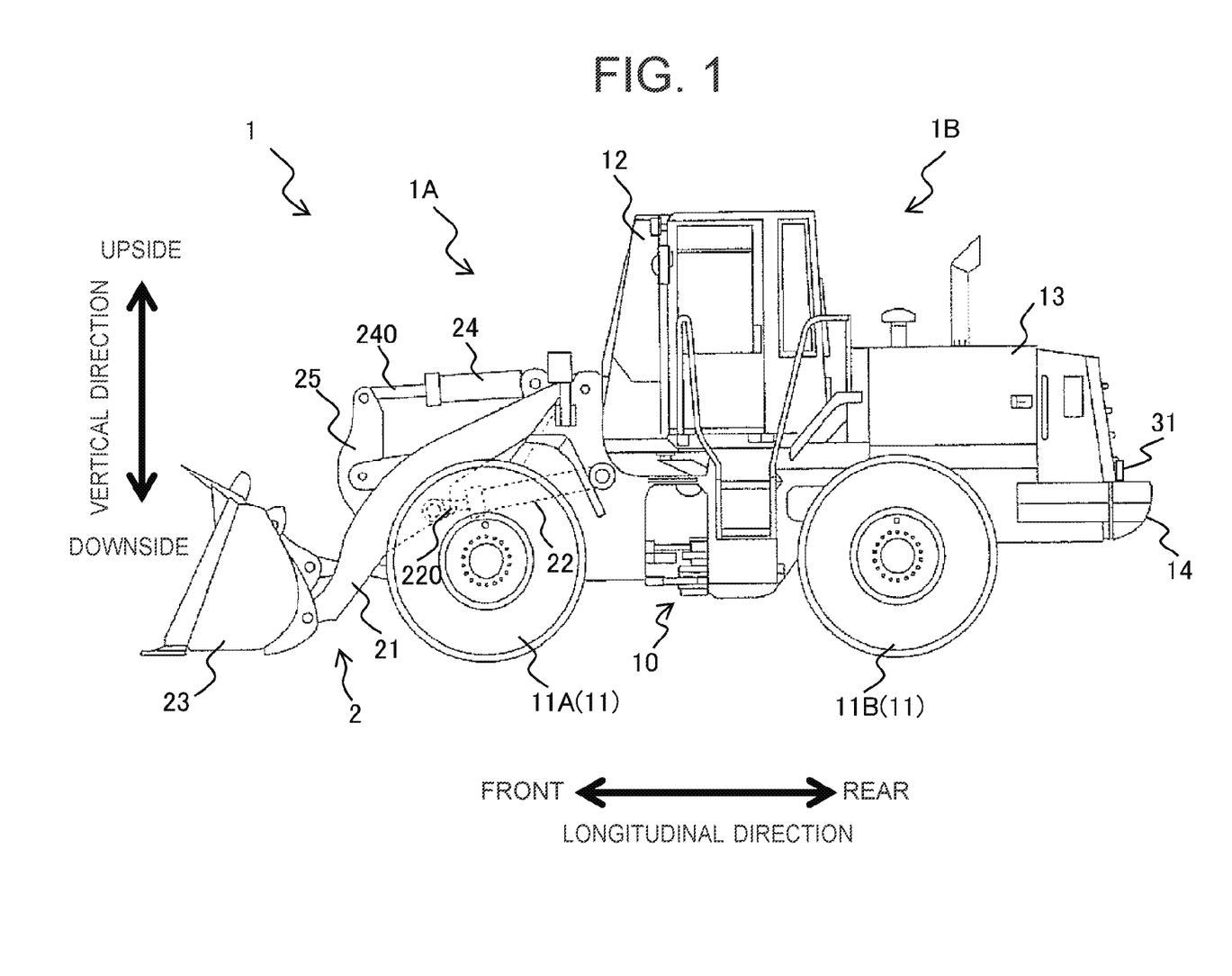
FIG. 1 is a side view illustrating appearance of a wheel loader according to an embodiment of the present invention.

FIG. 1 is a side view illustrating appearance of the wheel loader 1 according to the embodiment of the present invention.

The wheel loader 1 includes a plurality of wheels 11, and is an articulated type work vehicle which is swiveled on a central portion of a vehicle body and steered thereby. Specifically, a front frame 1A that is a front part of the vehicle body and a rear frame 1B that is a rear part of the vehicle body are connected to each other by a center joint 10 to swivel in the left and right direction so that the front frame 1A is bent in the left and right direction with respect to the rear frame 1B.

In the present embodiment, the wheel loader 1 includes four wheels 11 on its entire vehicle body. A pair of left and right front wheels 11A is provided on the front frame 1A, and a pair of left and right rear wheels 11B is provided on the rear frame 1B. FIG. 1 illustrates, among the four wheels 11, only the left front wheel 11A of the pair of left and right front wheels 11A and the left rear wheel 11B of the pair of left and right rear wheels 11B. In the following, there are cases where the pair of left and right front wheels 11A and the pair of left and right rear wheels 11B are collectively referred to as "a plurality of wheels 11".

The wheel loader 1 is a work vehicle configured to perform loading work by excavating such as earth and sand and minerals in a strip mine, etc., and loading them into such as a dump truck with a working device 2 attached to the front frame 1A.

The working device 2 includes a lift arm 21 attached to the front frame 1A, two lift arm cylinders 22 configured to expand and contract to rotate the lift arm 21 in the vertical direction with respect to the front frame 1A, a bucket 23 attached to a front end portion of the lift arm 21, a bucket cylinder 24 configured to expand and contract to rotate the bucket 23 in the vertical direction with respect to the lift arm 21, a bell crank 25 that is rotatably connected to the lift arm 21 and constitutes a link mechanism between the bucket 23 and the bucket cylinder 24, and a plurality of pipelines (not illustrated) for leading pressure oil to the two lift arm cylinders 22 and the bucket cylinder 24.

Each of the two lift arm cylinders 22 and the bucket cylinder 24 is one of the aspects of a hydraulic actuator that drives the working device 2. FIG. 1 illustrates, among the two lift arm cylinders 22 arranged in the lateral direction of the vehicle body, only the lift arm cylinder 22 disposed on the left side by a dashed line.

When a bottom chamber of each of the two lift arm cylinders 22 is supplied with hydraulic oil to expand rods 220, the lift arm 21 is rotated in the upward direction. When a rod chamber of each of the two lift arm cylinders 22 is supplied with hydraulic oil to contract the rods 220, the lift arm 21 is rotated in the downward direction.

Similarly, when a bottom chamber of the bucket cylinder 24 is supplied with hydraulic oil to expand a rod 240, the bucket 23 is tilted (rotated in the upward direction with respect to the lift arm 21). When a rod chamber of the bucket cylinder 24 is supplied with hydraulic oil to contract the rod 240, the bucket cylinder 24 is dumped (rotated in the downward direction with respect to the lift arm 21). In this connection, the bucket 23 can be replaced with various attachments such as a blade, and in addition to excavation work using the bucket 23, various work such as dozing work and snow removing work can be performed.

The rear frame 1B is further provided with an operator's cab 12 to be boarded by an operator, a mechanical room 13 that accommodates devices such as an engine, a controller, a hydraulic pump, etc. which will be described later, and a counterweight 14 for maintaining balance between the vehicle body and the working machine 2 to prevent the vehicle body from tilting. In the rear frame 1B, the operator's cab 12 is disposed on the front, the counterweight 14 is disposed on the rear, and the mechanical room 13 is disposed between the operator's cab and the counterweight 14, respectively.

<Operation of Wheel Loader 1 During Loading Work>

Next, an operation of the wheel loader 1 during loading work will be described with reference to FIG. 2 and FIG. 3. The wheel loader 1 performs an excavation operation and a loading operation by the method of "V-shape loading".

Figure 2:
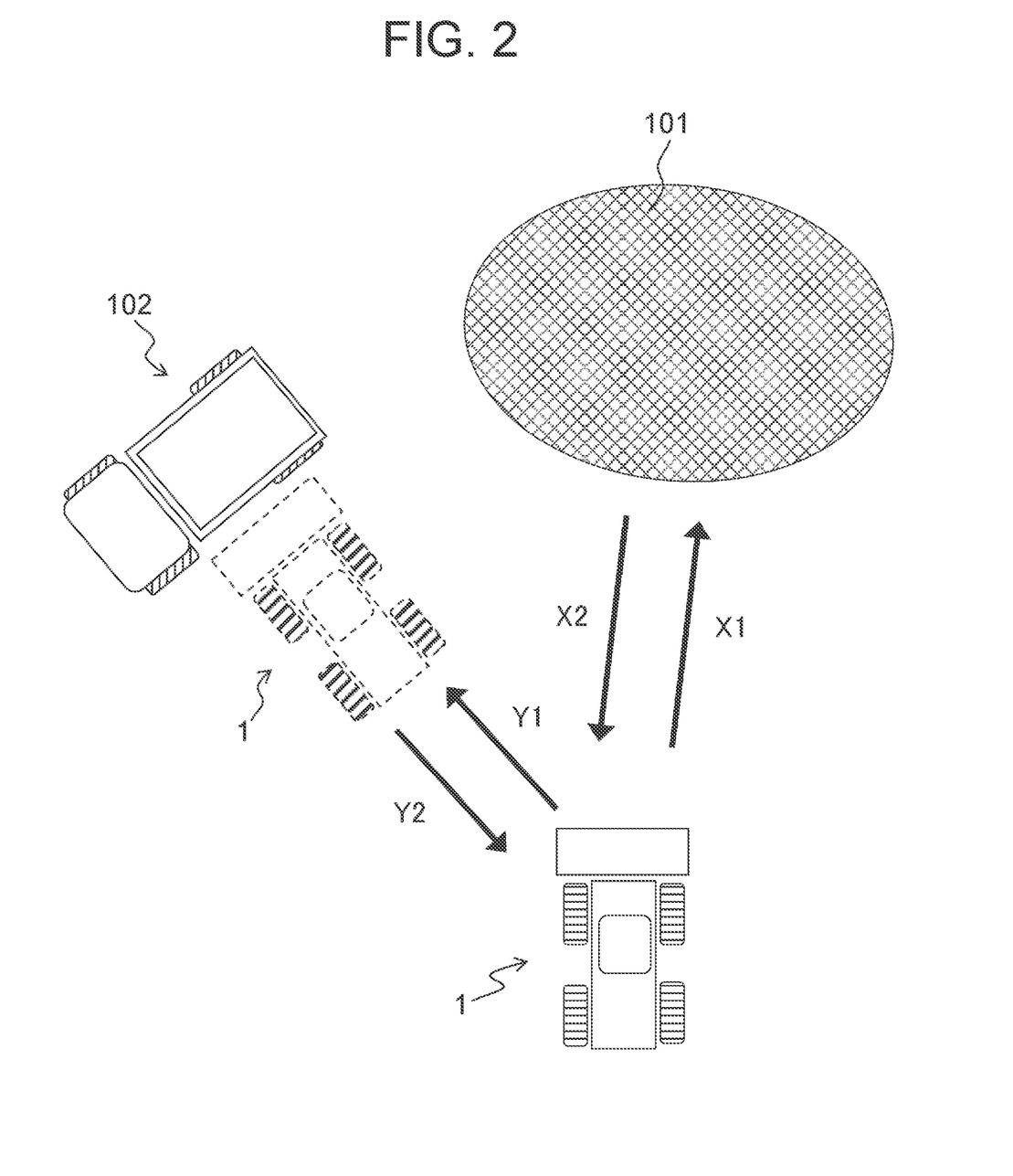
FIG. 2 explains V-shape loading performed by a wheel loader.

FIG. 2 explains the V-shape loading performed by the wheel loader 1. FIG. 3 explains a raise and run operation performed by the wheel loader 1.

First, the wheel loader 1 moves forward toward the natural ground 101 which is an object to be excavated (arrow X1 illustrated in FIG. 2), and performs an excavation operation by making the bucket 23 thrust into the natural ground 101. When completing the excavation work, the wheel loader 1 temporarily moves backward to the original position (arrow X2 illustrated in FIG. 2).

Subsequently, the wheel loader 1 moves forward toward a dump truck 102 which is a destination for loading, and stops in front of the dump truck 102 (arrow Y1 illustrated in FIG. 2). FIG. 2 illustrates the wheel loader 1 in a state of being stopped in front of the dump truck 102 with a dashed line.

Figure 3:
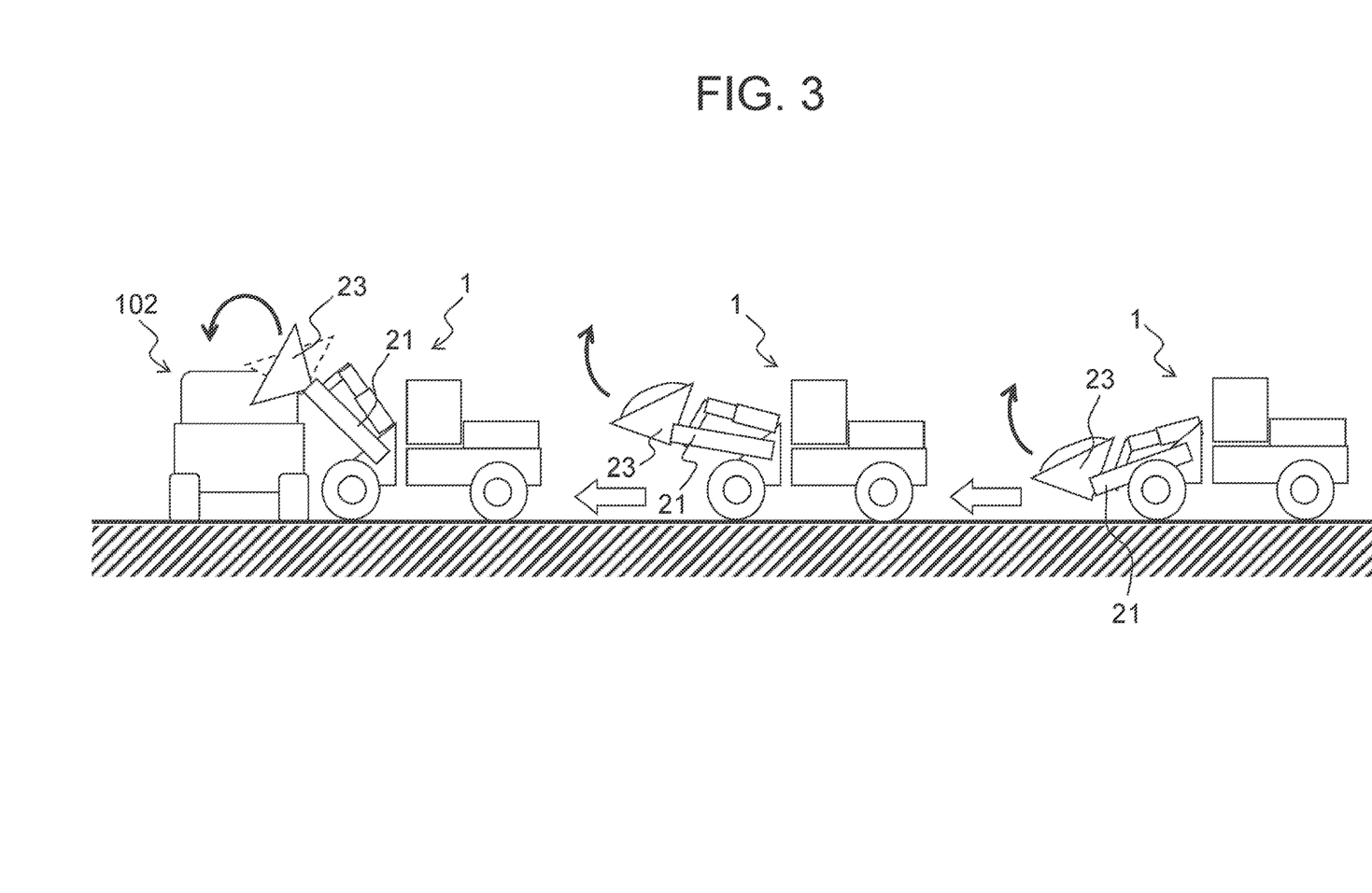
FIG. 3 explains a raise and run operation performed by a wheel loader.

Specifically, as illustrated in FIG. 3, the operator fully steps on an accelerator pedal (full throttle) and performs a lifting operation of the lift arm 21 (state illustrated on the right side in FIG. 3). Next, the operator further raises the lift arm 21 while maintaining the full throttle state, and at the same time adjusts the vehicle speed to prevent the vehicle body from colliding with the dump truck 102 by stepping on a brake pedal a little (state illustrated on the center in FIG. 3). Then, the operator stops the wheel loader 1 in front of the dump truck 102 by fully stepping on the brake pedal, and dumps the bucket 23 to load an object in the bucket 23 (earth and sand, mineral, etc.) on the dump truck 102 (state illustrated on the left side in FIG. 3). A series of operations illustrated in FIG. 3 performed by the wheel loader 1 during the loading operation is referred to as "raise and run operation".

As illustrated in FIG. 2, when completing the loading operation, the wheel loader 1 moves backward to the original position (arrow Y2 illustrated in FIG. 2). In this way, the wheel loader 1 reciprocates in a V-shape between the ground 101 and the dump truck 102 to perform the excavation operation and the loading operation.

<Drive System of Wheel Loader 1>

Next, a drive system of the wheel loader 1 will be described with reference to FIG. 4 to FIG. 7.

Figure 4:
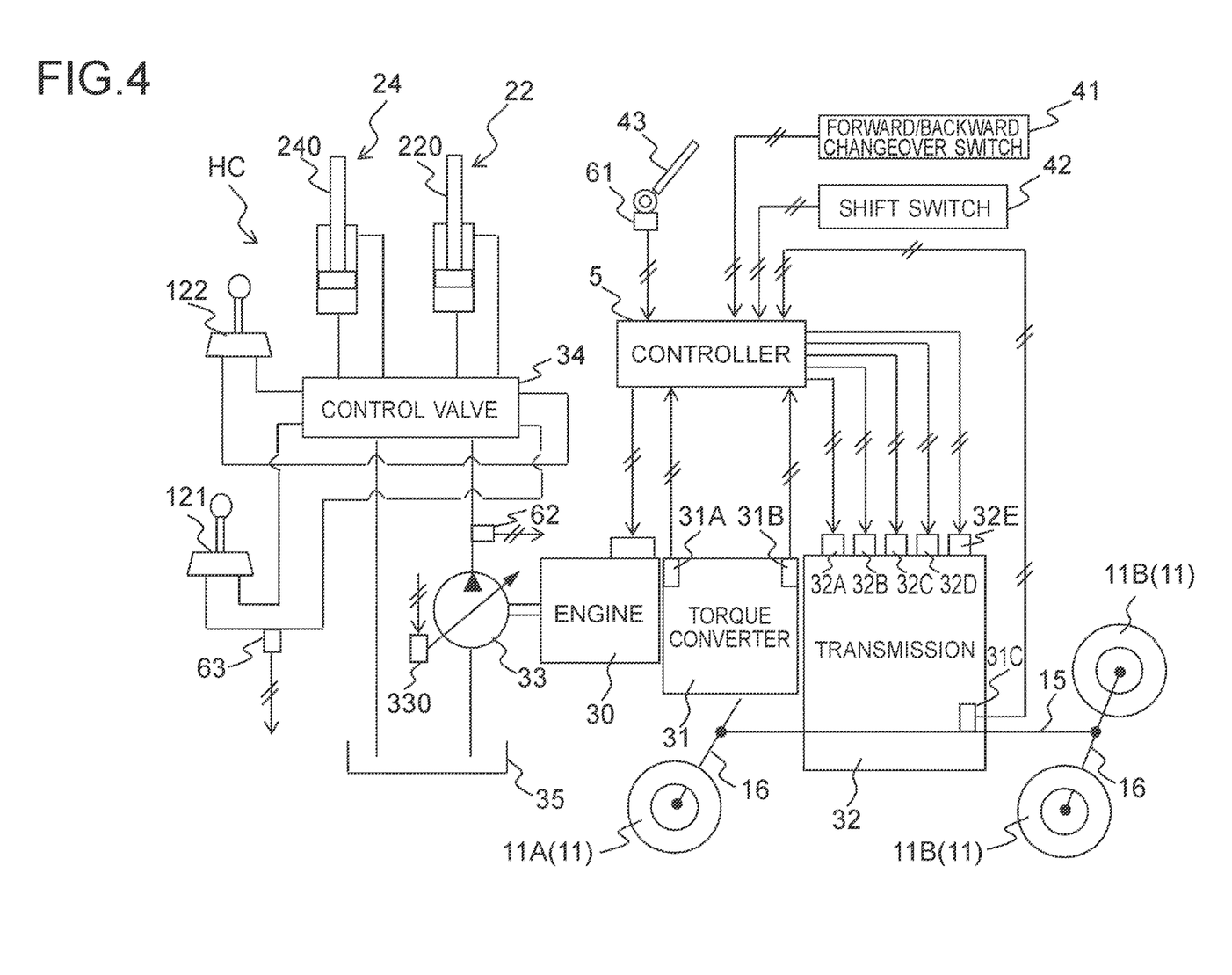
FIG. 4 illustrates a drive system configuration of a wheel loader.
Figure 5:
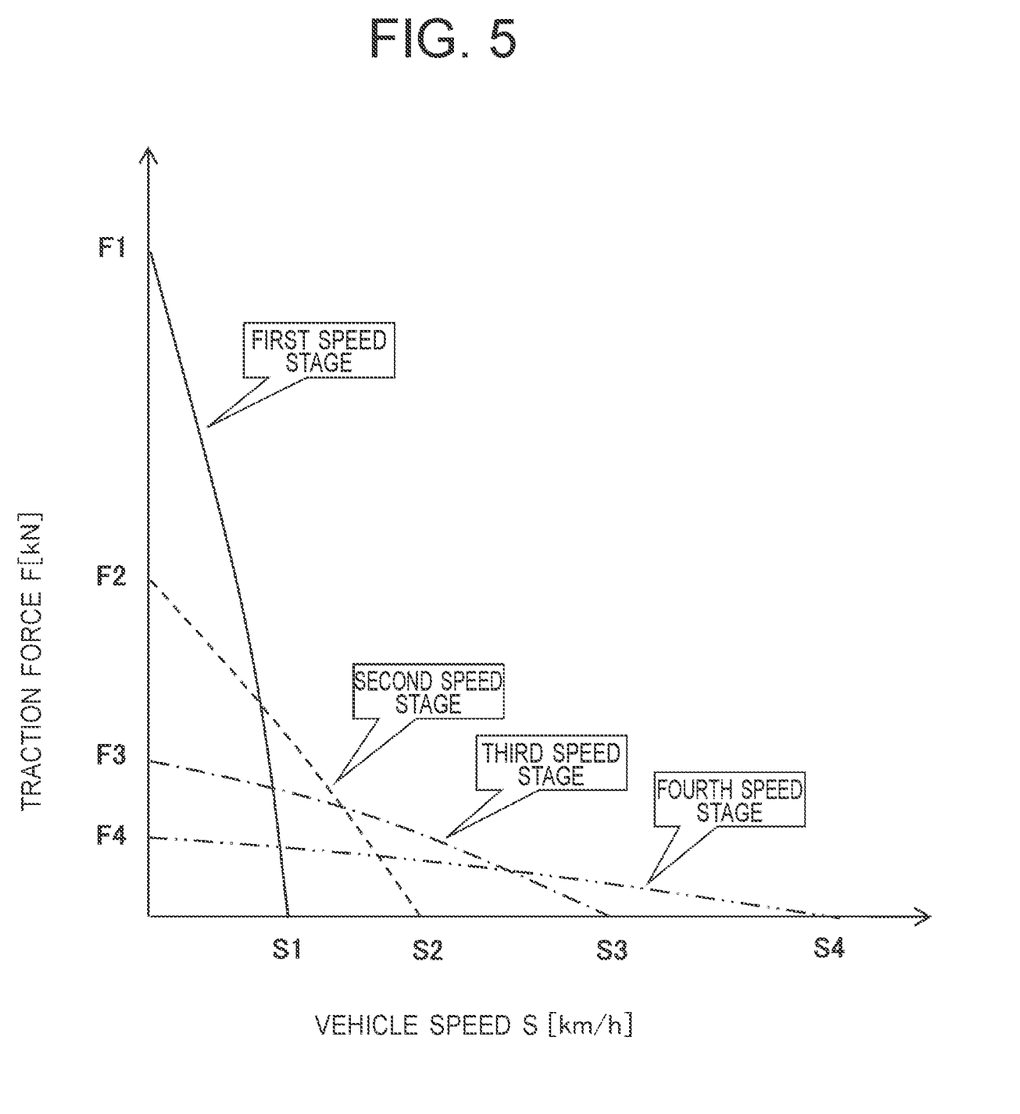
FIG. 5 illustrates a graph showing a relationship between vehicle speed and traction force in each speed stage.
Figure 6:
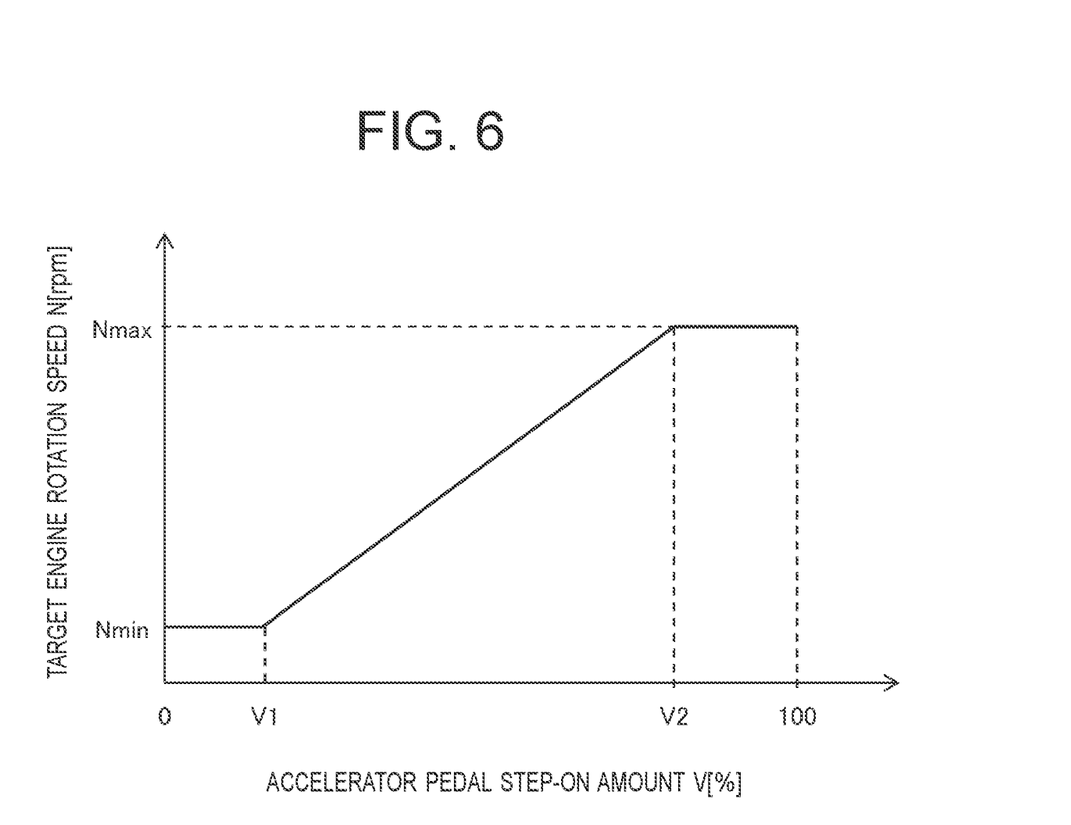
FIG. 6 illustrates a graph showing a relationship between an accelerator pedal step-on amount and target engine speed.
Figure 7:
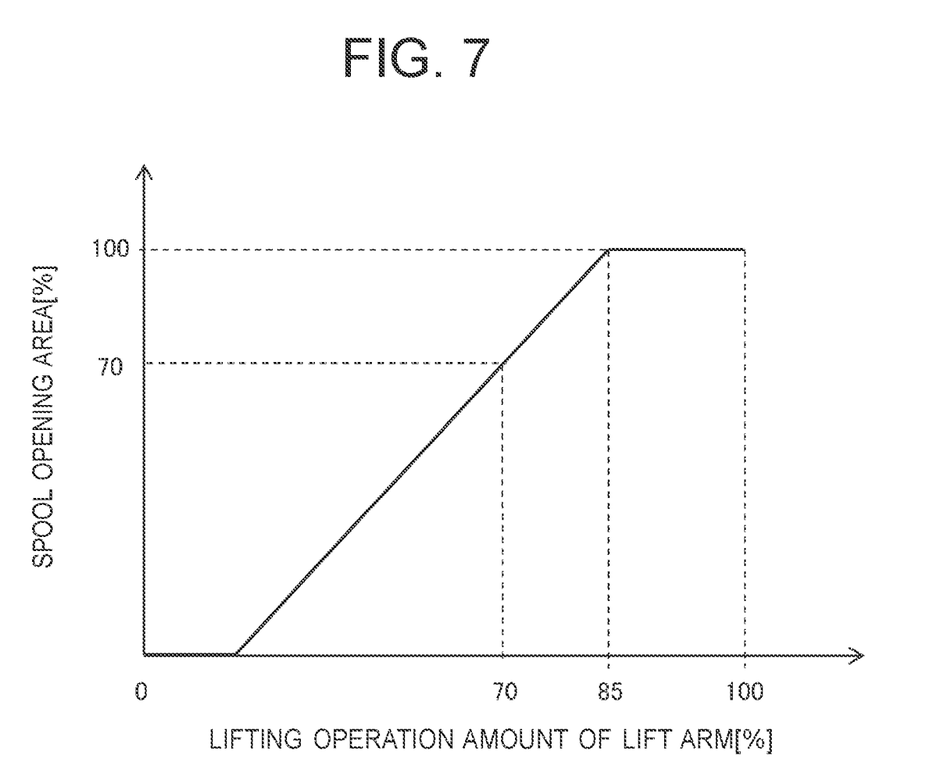
FIG. 7 illustrates a graph showing a relationship between a lifting amount of a lift arm and a spool opening area.

FIG. 4 illustrates a drive system configuration of the wheel loader 1. FIG. 5 illustrates a graph showing a relationship between vehicle speed S and traction force F in each speed stage. FIG. 6 illustrates a graph showing a relationship between an accelerator pedal step-on amount V and target engine speed N. FIG. 7 illustrates a graph showing a relationship between a lifting amount of the lift arm 21 and a spool opening area.

The wheel loader 1 according to the present embodiment is configured to control traveling of the vehicle body by the torque converter type traveling drive system. As illustrated in FIG. 4, the traveling drive system includes an engine 30, a torque converter 31 connected to an output shaft of the engine 30, and a transmission 32 connected to an output shaft of the torque converter 31. Each of the engine 30, the torque converter 31, and the transmission 32 is controlled based on a command signal from a controller 5. The wheel loader 1 travels by transmitting the drive force of the engine 30 to the plurality of wheels 11 via the torque converter 31 and the transmission 32.

The torque converter 31 is a hydraulic clutch including an impeller, a turbine, and a stator, and has the function to amplify the output torque with respect to the input torque (torque transmitted from the engine 30), that is, the function to set a torque ratio (=output torque/input torque) to 1 or more. This torque ratio decreases as a torque converter speed ratio (=output shaft rotation speed/input shaft rotation speed), which is a ratio of the rotation speed of the input shaft of the torque converter 31 and the rotation speed of the output shaft thereof, increases. With the torque converter 31, the rotation speed of the engine 30 is changed and then transmitted to the transmission 32.

The transmission 32 includes a plurality of gears. In the transmission 32, at the time of forward traveling or backward traveling, a combination of the plurality of gears is controlled by first to fifth solenoid control valves 32A to 32E so as to obtain a gear ratio corresponding to either of first to fourth speed stages illustrated in FIG. 5. With this configuration, the transmission 32 changes torque, rotation speed, and a rotation direction of the output shaft of the torque converter 31 and transmits them to the plurality of wheels 11.

A traveling direction, that is, forward traveling or backward traveling, of the wheel loader 1 is switched by a forward/backward changeover switch 41 which severs as a forward/backward switching device. The speed stages (first to fourth speed stages illustrated in FIG. 5) of the transmission 32 is selected by a shift switch 42 which serves as a speed stage selection device. Each of the forward/backward changeover switch 41 and the shift switch 42 is provided in the operator's cab 12 (see FIG. 1).

As illustrated in FIG. 5, in the first speed stage of the transmission 32, the maximum vehicle speed is set to S1. In the second speed stage, the maximum vehicle speed is set to S2 which is greater than S1. In the third speed stage, the maximum vehicle speed is set to S3 which is greater than S2. In the fourth speed stage, the maximum vehicle speed is set to S4 which is greater than S3 (S1<S2<S3<S4).

The traction force F of the vehicle body in each of the first to fourth speed stages is F1 in the first speed stage, F2 in the second speed stage which is smaller than F1, F3 in the third speed stage which is smaller than F2, and F4 in the fourth speed stage which is smaller than F3 (F1>F2>F3>F4). Thus, the maximum vehicle speed decreases as the speed stage decreases while the traction force F of the vehicle body increases. In this connection, FIG. 5 illustrates the first speed stage by a solid line, the second speed stage by a dashed line, the third speed stage by a dashed line with one dot, and the fourth speed stage by a dashed line with two dots, respectively.

The first speed stage is the lowest speed stage of the transmission 32 and is selected, for example, during an operation requiring the traction force such as excavation or hill climbing. As illustrated in FIG. 5, the maximum vehicle speed at the first speed stage is the lowest among the first to fourth speed stages, while the traction force F is the greatest among the first to fourth speed stages. The second speed stage is a speed stage which is set greater by one speed stage than the lowest speed stage of the transmission 32, and for example, is selected during the above-mentioned loading operation (at the time of performing the raise and run operation). As illustrated in FIG. 5, the maximum vehicle speed at the second speed stages is faster than that that at the first speed stage (for example, 9 to 15 km/h), and the traction force F is much smaller than that that at the first speed stage.

As illustrated in FIG. 4, in the torque converter type traveling drive system, firstly, when the operator steps on the accelerator pedal 43 provided in the operator's cab 12, the engine 30 rotates, and the input shaft of the torque converter 31 rotates with the rotation of the engine 30. Then, the output shaft of the torque converter 31 rotates in accordance with the set torque converter speed ratio, and the output torque from the torque converter 31 is transmitted to the plurality of wheels 11 via the transmission 32, a propeller shaft 15, and an axle 16, respectively, which makes the wheel loader 1 travel.

More specifically, firstly, a step-on amount sensor 61 mounted on the accelerator pedal 43 detects the step-on amount V of the accelerator pedal 43 (hereinafter, simply referred to as "accelerator pedal step-on amount V"), and inputs the detected accelerator pedal step-on amount V to the controller 5. Next, the controller 5 outputs a command signal relating to the target engine speed N corresponding to the input accelerator pedal step-on amount V to the engine 30. Then, the engine 30 is controlled to the rotation speed in accordance with the target engine speed N.

As illustrated in FIG. 6, the step-on amount of the accelerator pedal 43 is proportional to the target engine speed N, and when the accelerator pedal step-on amount V increases, the target engine speed N increases. When the accelerator pedal step-on amount reaches V2, the target engine speed N reaches the maximum rotation speed Nmax. The range in which the accelerator pedal step-on amount V is 0 to V1 (for example, the range between 0% to 20 or 30%) is set as a dead band where the target engine speed N becomes constant at the predetermined minimum rotation speed Nmin regardless of the accelerator pedal step-on amount V.

Then, the engine speed controlled in accordance with the target engine speed N, that is, the engine rotation speed, is changed by the torque converter 31 and the transmission 32, and transmitted to the propeller shaft 15 as the vehicle speed S of the wheel loader 1. The input shaft of the torque converter 31 includes a first rotation speed sensor 31A configured to detect the speed of the engine 30 as the rotation speed, and the output shaft of the torque converter 31 includes a second rotation speed sensor 31B configured to detect the speed of the engine 30 after the speed change by the torque converter 31. The vehicle speed S is detected by a third rotation speed sensor 31C as the rotation speed of the propeller shaft 15. The step-on amount sensor 61 is one of the aspects of a traveling state sensor for detecting a traveling state of the vehicle body.

For example, when performing the raise and run operation, the operator switches the forward/backward changeover switch 41 to a forward movement position, and selects the second speed stage by the shift switch 42. A switching signal relating to forward movement output from the forward/backward changeover switch 41 and a speed stage signal relating to the second speed stage output from the shift switch 42 are input to the controller 5, respectively. The controller 5 generates a control signal for selecting a combination of the plurality of gears to obtain a gear ratio making the forward movement clutch of the transmission 32 engage with the second speed stage clutch, and outputs the control signal to each of the first to fifth solenoid control valves 32A to 32E. Thus, the engine rotation speed corresponding to the accelerator pedal step-on amount V is changed to the rotation speed corresponding to the second speed stage via the transmission 32, whereby the wheel loader 1 travels forward at the vehicle speed S corresponding to the second speed stage.

Furthermore, as illustrated in FIG. 4, the wheel loader 1 includes a hydraulic circuit HC for loading which drives the working device 2. The hydraulic circuit HC for loading is provided with a hydraulic pump 33, the lift arm cylinders 22, the bucket cylinder 24, and a control valve 34 for controlling a flow of hydraulic oil (direction and flow rate) discharged from the hydraulic pump 33 and flowing into each of the lift arm cylinders 22 and the bucket cylinder 24. In this connection, FIG. 4 illustrates only one of the two lift arm cylinders 22 for the purpose of simplifying the configuration.

The hydraulic pump 33 supplies hydraulic oil sucked from a hydraulic oil tank 35 to each of the lift arm cylinders 22 and the bucket cylinder 24. In the present embodiment, the hydraulic pump 33 is a swash plate type or a swash shaft type variable displacement hydraulic pump in which a displacement volume is controlled in accordance with a tilt angle. The tilt angle is adjusted by a regulator 330 in accordance with a command signal output from the controller 5. In this connection, the hydraulic pump 33 may not necessarily be a variable displacement hydraulic pump, but may be a fixed displacement hydraulic pump.

The discharge pressure Pa of the hydraulic pump 33 is detected by a discharge pressure sensor 62 provided on a pipeline connected to the discharge side of the hydraulic pump 33. The discharge pressure Pa of the hydraulic pump 33 varies depending on an operation state of the lift arm 21 and the bucket 23 (working device 2). Therefore, the discharge pressure sensor 62 is one of the aspects of an operation state sensor for detecting the operation state of the lift arm 21.

Each of the lift arm cylinders 22 and the bucket cylinder 24 is driven in accordance with an operation of a lift arm operation lever 121 and an operation of a bucket operation lever 122 provided in the operator's cab 12 (see FIG. 1).

For example, when the operator operates the lift arm operation lever 121, the pilot pressure Pi proportional to an operation amount is generated as an operation signal. The generated pilot pressure Pi acts on left and right pressure receiving chambers of the control valve 34, and the spool in the control valve 34 strokes in accordance with the pilot pressure Pi. Thus, the hydraulic oil discharged from the hydraulic pump 33 flows into the lift arm cylinders 22 in accordance with the direction and the flow rate corresponding to the operation of the lift arm operation lever 121.

The pilot pressure Pi generated based on the operation of the lift arm operation lever 121 is detected by a pilot pressure sensor 63 provided on a pilot pipeline connecting the lift arm operation lever 121 and the control valve 34. The pilot pressure sensor 63 corresponds to an operation amount sensor for detecting the operation amount of the lift arm 21, and similarly to the discharge pressure sensor 62, is one of the aspects of the operation state sensor for detecting the operation state of the lift arm 21.

As illustrated in FIG. 7, the lifting operation amount of the lift arm 21 is proportional to the opening area of the spool of the control valve 45, and when the lifting operation amount of the lift arm 21 increases, the opening area of the spool also increases. When the operator operates the lift arm operation lever 210 largely in the direction of moving up the lift arm 21, the amount of hydraulic oil flowing into the lift arm cylinders 22 increases, and thus the rods 220 are rapidly extended.

In FIG. 7, the range in which the lifting operation amount of the lift arm 21 is between 0% and 20% is set as a dead band where the spool opening area becomes constant at 0% (spool is not opened) regardless of the lifting operation amount of the lift arm 21. When the lifting operation amount of the lift arm 21 is in the range of 85% to 100%, the spool opening area is constant at 100%, and a full lever operation state is maintained.

With respect to the operation of the bucket 23, similarly to the operation of the lift arm 21, the pilot pressure Pi generated in accordance with the operation amount of the bucket operation lever 122 acts on the control valve 34, and thus the spool opening area of the control valve 34 is controlled. As a result, the amount of hydraulic oil flowing into and out from the bucket cylinder 24 is adjusted.

Here, in the raise and run operation during the loading operation, since the wheel loader 1 raises the lift arm 21 while traveling forward toward the dump truck 102 (see FIG. 3) at the vehicle speed corresponding to the second speed stage, it is necessary to suppress the vehicle speed, and at the same time, increase the discharge flow rate of the hydraulic pump 33 by increasing the engine speed so as to increase the flow rate of the hydraulic oil to be supplied to the lift arm 21. Accordingly, in the wheel loader 1, the controller 5 controls the transmission 32 so as to limit the vehicle speed without actuating the brake.

<Configuration of Controller 5>

Next, the configuration of the controller 5 will be described with reference to FIG. 8.

Figure 8:
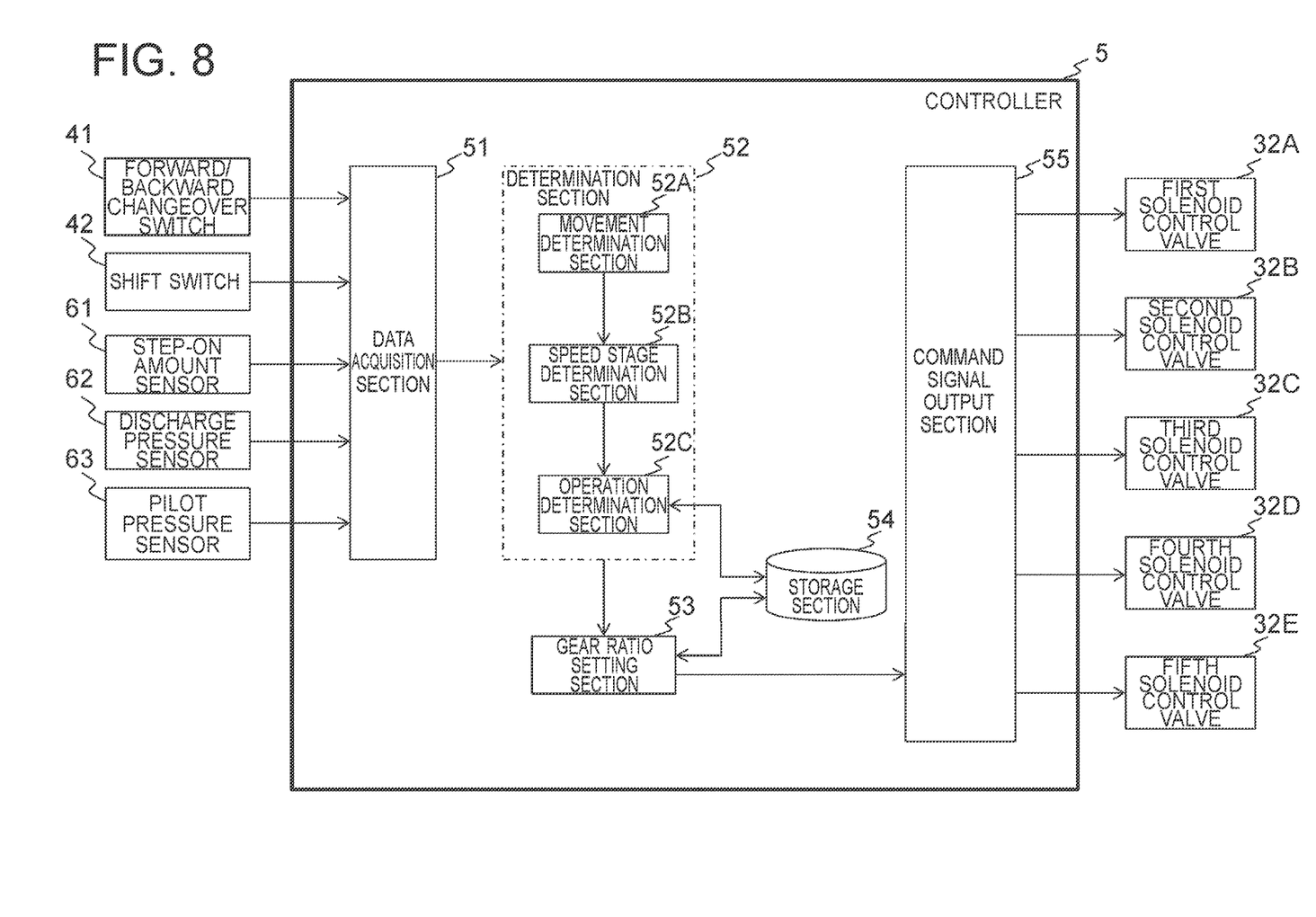
FIG. 8 is a functional block diagram illustrating functions of a controller.

FIG. 8 is a functional block diagram illustrating functions of the controller 5.

The controller 5 is configured such that a CPU, a RAM, a ROM, an HDD, an input I/F, and an output I/F are connected to each other via a bus. Various operation devices such as the forward/backward changeover switch 41 and the shift switch 42, and various sensors such as the step-on amount sensor 61, the discharge pressure sensor 62, and the pilot pressure sensor 63 are connected to the input I/F. The first to fifth solenoid control valves 32A to 32E, etc. are connected to the output I/F.

In this hardware configuration, the CPU reads out a control program (software) stored in a recording medium such as the ROM, the HDD, or an optical disk, expands it on the RAM, and executes the expanded control program. Thereby, the control program and the hardware are operated in cooperation, which realizes the functions of the controller 5.

In the present embodiment, the controller 5 is described by a combination of software and hardware. Meanwhile, the present invention is not limited thereto, but an integrated circuit that realizes the functions of a control program executed on the side of the wheel loader 1 may be used.

As illustrated in FIG. 5, the controller 5 includes a data acquisition section 51, a determination section 52, a gear ratio setting section 53, a storage section 54, and a command signal output section 55.

The data acquisition section 51 is configured to acquire data relating to the switching signal output from the forward/backward changeover switch 41, the speed stage signal output from the shift switch 42, the accelerator pedal step-on amount V detected by the step-on amount sensor 61, the discharge pressure Pa detected by the discharge pressure sensor 62, and the pilot pressure Pi detected by the pilot pressure sensor 63, respectively.

The determination section 52 includes a movement determination section 52A, a speed stage determination section 52B, and an operation determination section 52C.

The movement determination section 52A is configured to determine a traveling direction of the vehicle body based on the switching signal acquired by the data acquisition section 51, that is, determine to which traveling direction of forward movement or backward movement the forward/backward changeover switch 41 is switched. The movement determination section 52A also determines whether the vehicle body is in a state of traveling based on the accelerator pedal step-on amount V acquired by the data acquisition section 51.

The speed stage determination section 52B is configured to determine whether the second speed stage is selected as the speed stage of the transmission 32 by the shift switch 42 based on the speed stage signal acquired by the data acquisition section 51 when the movement determination section 52A determines that the vehicle body is traveling forward.

The operation determination section 52C is configured to determine whether the lift arm 21 is operated in the upward direction based on the discharge pressure Pa and the pilot pressure Pi acquired by the data acquisition section 51. In the present embodiment, the lifting operation of the lift arm 21 is accurately determined based on both the discharge pressure Pa and the pilot pressure Pi, meanwhile, it may be determined based on the detected value of either at least the discharge pressure Pa or the pilot pressure Pi. That is, as the operation state sensor, one of at least the discharge pressure sensor 62 and the pilot pressure sensor 63 may be employed. In the case of determination of the lifting operation of the lift arm 21 based on the discharge pressure Pa or the pilot pressure Pi, it is possible to reduce erroneous determination of the lifting operation of the lift arm 21 as compared with determination based on, for example, the bottom pressure of the lift arm cylinders 22.

The gear ratio setting section 53 is configured to set, as a gear ratio of the transmission 32, an intermediate gear ratio between a gear ratio corresponding to the first speed stage and a gear ratio corresponding to the second speed stage when the determination section 52 determines that the vehicle body is traveling forward at the second speed stage and the lifting operation of the lift arm 21 is being performed. Furthermore, the gear ratio setting section 53 sets, as the gear ratio of the transmission 32, the gear ratio corresponding to the second speed stage when the movement determination section 52A determines that the forward/backward changeover switch 41 is switched from the forward movement to the backward movement after the vehicle speed limitation processing is executed.

The storage section 54 is a memory which stores a discharge pressure threshold Path and a pilot pressure threshold Pith relating to the determination of the lifting operation of the lift arm 21. Each of the discharge pressure threshold Path and the pilot pressure threshold Pith is a threshold for identifying start of the lifting operation of the lift arm 21. Furthermore, the storage section (memory) 54 stores, in addition to a command value corresponding to the clutch pressure which has been adjusted to be shifted at a gear ratio set for each of the first to fourth speed stages, a command value corresponding to the clutch pressure which has been adjusted to be shifted at the intermediate gear ratio between the gear ratio corresponding to the first speed stage and the gear ratio corresponding to the second speed stage. The intermediate gear ratio is a gear ratio set so as to obtain predetermined output torque associated with the loading operation of the wheel loader 1 and the vehicle speed corresponding to the output torque.

The command signal output section 55 is configured to output a command signal for selecting a combination of the plurality of gears corresponding to the gear ratio which has been set by the gear ratio setting section 53 to each of the first to fifth solenoid control valves 32A to 32E. In this way, the wheel loader 1 obtains the vehicle speed corresponding to the speed stage controlled by the controller 5.

<Processing by Controller 5>

Next, a specific flow of processing executed by the controller 5 will be described with reference to FIG. 9.

Figure 9:
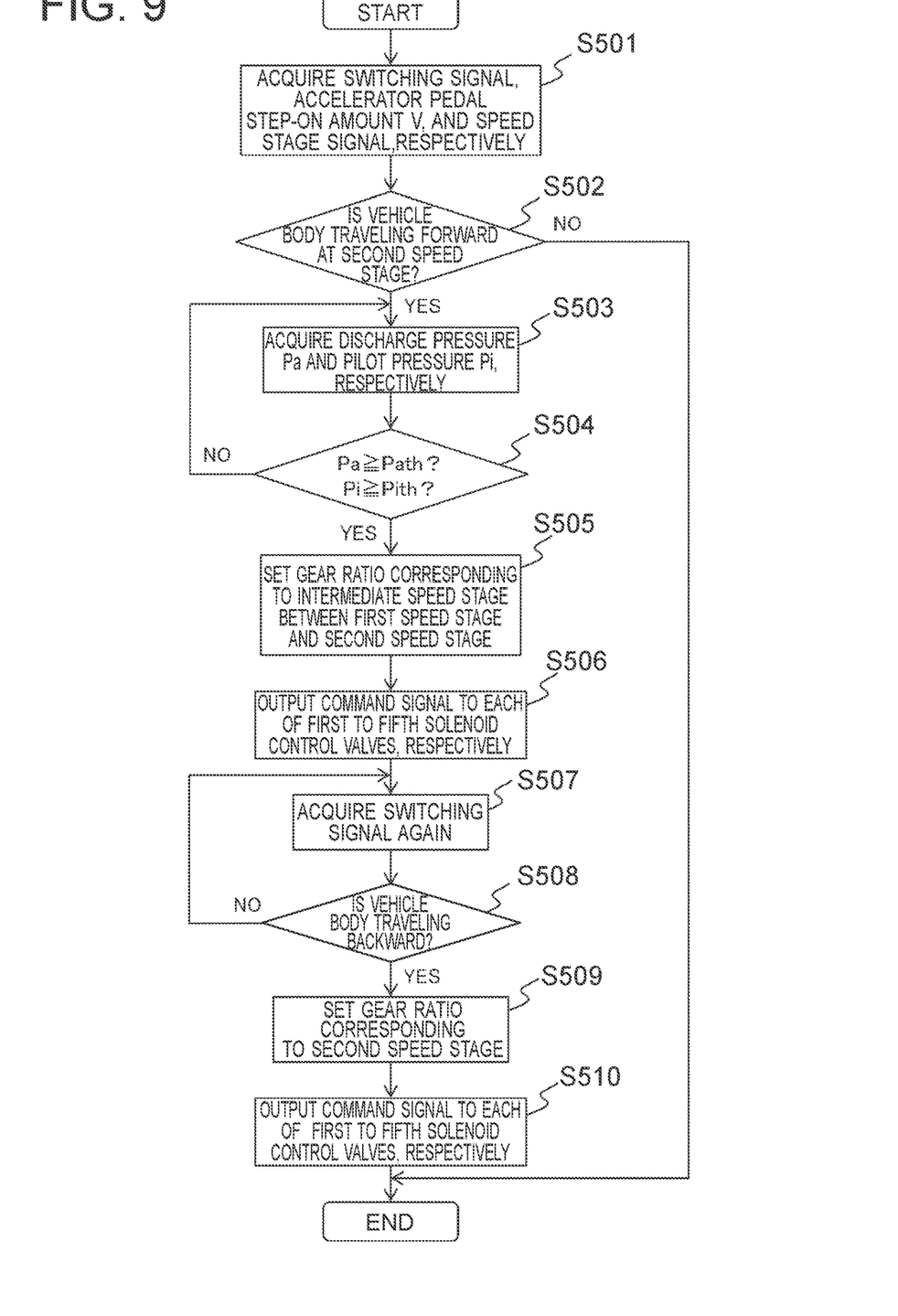
FIG. 9 illustrates a flowchart of processing executed by a controller.

FIG. 9 illustrates a flowchart of the processing executed by the controller 5.

Firstly, the data acquisition section 51 acquires the switching signal output from the forward/backward changeover switch 41, the accelerator pedal step-on amount V detected by the step-on amount sensor 61, and the speed stage signal output from the shift switch 42, respectively (step S501).

Next, the movement determination section 52A determines whether the vehicle body is traveling forward based on the switching signal and the accelerator pedal step-on amount V acquired in step S501, and the speed stage determination section 52B determines whether the second speed stage is selected by the shift switch 42 based on the speed stage signal acquired in step S501 (step S502). That is, in step S502, it is determined whether the vehicle body is traveling forward at the second speed stage.

When it is determined that the vehicle body is traveling forward at the second speed stage in step S502 (step S502/YES), the data acquisition section 51 acquires the discharge pressure Pa detected by the discharge pressure sensor 62 and the pilot pressure Pi detected by the pilot pressure sensor 63, respectively (step S503). When it is determined that the vehicle body is not traveling forward at the second speed stage in step S502 (step S502/NO), the controller 5 terminates the processing.

Next, the operation determination section 52C determines whether the discharge pressure Pa acquired in step S503 is equal to or greater than the discharge pressure threshold Path, and whether the pilot pressure Pi acquired in step S503 is equal to or greater than the pilot pressure threshold Pith (step S504). That is, in step S504, it is determined whether the lifting operation of the lift arm 21 is being performed.

When it is determined in step S504 that the discharge pressure Pa is equal to or greater than the discharge pressure threshold Path (Pa≥Path) and the pilot pressure Pi is equal to or greater than the pilot pressure threshold Pith (Pi≥Pith), that is, when it is determined whether the lifting operation of the lift arm 21 is being performed (step S504/YES), the gear ratio setting section 53 sets, as the gear ratio of the transmission 32, the intermediate gear ratio between the gear ratio corresponding to the first speed stage and the gear ratio corresponding to the second speed stage (step S505).

In this connection, when it is determined in step S504 that the discharge pressure Pa is smaller than the discharge pressure threshold Path (Pa<Path) and the pilot pressure Pi is smaller than the pilot pressure threshold Pith (Pi<Pith), that is, when it is determined that the lifting operation of the lift arm 21 is not being performed (step S504/NO), the processing returns to step S503 until the lifting operation of the lift arm 21 is started.

Next, the command signal output section 55 outputs, to each of the first to fifth solenoid control valves 32A to 32E, a command signal for selecting a combination of the plurality of gears corresponding to the gear ratio which has been set in step S505 (step S506). Thus, the vehicle speed of the wheel loader 1 is limited from the vehicle speed corresponding to the second speed stage to the vehicle speed corresponding to an intermediate speed stage which is between the first speed stage and the second speed stage.

In this way, at the time of the raise and run operation during the loading operation, the wheel loader 1 decreases the vehicle speed to the vehicle speed which is slower than the vehicle speed corresponding to the second speed stage but is faster than the vehicle speed corresponding to the first speed stage. Accordingly, it is possible to avoid a situation where the vehicle speed becomes too slow. In addition, since there is less difference between the stages compared with the case of decreasing the speed stage from the second speed stage to the first speed stage, the operator hardly feels discomfort at the time of shifting gears.

Furthermore, at the time of the vehicle speed limitation performed by the controller 5, the second speed stage is kept selected by the shift switch 42. Accordingly, it is possible to make the operator feel that the wheel loader 1 automatically limits the vehicle speed since the wheel loader 1 should have been traveling forward at the vehicle speed corresponding to the second speed stage. In this case, for example, it may be configured to display on a monitor in the operator's cab 12 that the vehicle speed is being automatically limited.

Next, the data acquisition section 51 acquires the switching signal output from the forward/backward changeover switch 41 again (step S507). Subsequently, the movement determination section 52A determines whether the forward/backward changeover switch 41 is switched from the forward movement to the backward movement based on the switching signal acquired in step S507 (step S508).

When it is determined in step S508 that the forward/backward changeover switch 41 is switched from the forward movement to the backward movement (step S508/YES), the gear ratio setting section 53 sets, as the gear ratio of the transmission 32, the gear ratio corresponding to the second speed stage (step S509).

In this connection, when it is determined in step S508 that the forward/backward changeover switch 41 is not switched from the forward movement to the backward movement (step S508/NO), the processing returns to step S507 and is repeated until the forward/backward changeover switch 41 is switched from the forward movement to the backward movement.

Next, the command signal output section 55 outputs, to each of the first to fifth solenoid control valves 32A to 32E, a command signal for selecting a combination of the plurality of gears corresponding to the gear ratio which has been set in step S509 (step S510), and then the processing executed by the controller 5 is terminated. In this way, when the forward/backward changeover switch 41 is switched from the forward movement to the backward movement, the controller 5 changes the gear ratio from the intermediate gear ratio between the gear ratio corresponding to the first speed stage and the gear ratio corresponding to the second speed stage to the gear ratio corresponding to the second speed stage. Accordingly, the limitation of the vehicle speed performed by the controller 5 is released, whereby the vehicle speed of the wheel loader 1 returns to the vehicle speed corresponding to the second speed stage from the vehicle speed corresponding to the intermediate speed stage between the first speed stage and the second speed stage.

As described above, when the vehicle travels backward after completion of loading to the dump truck 102, since the vehicle speed automatically returns to the vehicle speed corresponding to the second speed stage before the vehicle speed limitation, it is possible to release the limitation of the vehicle speed performed by the controller 5 without making the operator feel discomfort.

In the above, the embodiment of the present invention has been described. It should be noted that the present invention is not limited to the embodiment described above, and various modifications are included. For example, the embodiment described above has been explained in detail in order to clarify the present invention, but is not necessarily limited to those having all the configurations described. In addition, a part of the configuration of the present embodiment can be replaced with that of another embodiment, and the configuration of another embodiment can be added to the configuration of the present embodiment. Furthermore, it is possible to add, delete, or replace another configuration with respect to a part of the configuration of the present embodiment.

For example, in the embodiment described above, the traveling state of the vehicle body is determined based on the accelerator pedal step-on amount V detected by the step-on amount sensor 61. Meanwhile, the present invention is not limited thereto, and the traveling state of the vehicle body may be determined by using, for example, a vehicle speed sensor.

REFERENCE SIGNS LIST

1: wheel loader
2: working device
5: controller
11, 11A: front wheel (wheel)
11, 11B: rear wheel (wheel)
21: lift arm
22: lift arm cylinder (hydraulic actuator)
24: bucket cylinder (hydraulic actuator)
30: engine
31: torque converter
32: transmission
32A-32E: first to fifth solenoid control valve
33: hydraulic pump
34: forward/backward changeover switch (forward/backward switching device)
42: shift switch (speed stage selection device)
61: step-on amount sensor (traveling state sensor)
62: discharge pressure sensor (operation state sensor)
63: pilot pressure sensor (operation amount sensor, operation state sensor)

The invention claimed is:
1. A wheel loader comprising:
a vehicle body having a plurality of wheels;
a working device having a lift arm which is mounted rotatably in a vertical direction with respect to the vehicle body;
an engine mounted on the vehicle body;
a torque converter configured to amplify torque transmitted from the engine;

a transmission configured to control a combination of a plurality of gears by means of a plurality of solenoid control valves so as to change and transmit the amplified torque output from the torque converter to the plurality of wheels;

a forward/backward switching device configured to switch forward movement and backward movement of the vehicle body;

a speed stage selection device configured to select a speed stage of the transmission;

a traveling state sensor configured to detect a traveling state of the vehicle body;

an operation state sensor configured to detect an operation state of the lift arm; and a controller configured to generate a control signal for selecting the combination of the plurality of gears to obtain a gear ratio corresponding to the selected speed stage based on a switching signal output from the forward/backward switching device and the speed stage selected by the speed stage selection device, and output the control signal to the plurality of solenoid control valves so as to control the transmission, wherein the controller is further configured to:

in a case where the vehicle body is traveling forward at vehicle speed corresponding to a speed stage set greater by one speed stage than a lowest speed stage of the transmission, as well as in a case where the operation state of the lift arm detected by the operation state sensor is an operation in an upward direction, based on the switching signal output from the forward/backward switching device, the traveling state of the vehicle body detected by the traveling state sensor, and the speed stage selected by the speed stage selection device, output, to the plurality of solenoid control valves, a signal for selecting the combination of the plurality of gears corresponding to an intermediate gear ratio which is between a gear ratio corresponding to the speed stage set greater by one speed stage than the lowest speed stage and a gear ratio corresponding to the lowest speed stage.

2. The wheel loader according to claim 1,
wherein the operation state sensor is either at least an operation amount sensor configured to detect an operation amount of the lift arm or a discharge pressure sensor configured to detect discharge pressure of a hydraulic pump that supplies hydraulic oil to a hydraulic actuator that drives the working device.

3. The wheel loader according to claim 1,
wherein the controller is further configured to:
in a case where the forward/backward switching device is switched from the forward movement to the backward movement, change the intermediate gear ratio to the gear ratio corresponding to the speed stage set greater by one speed stage than the lowest speed stage, and output, to the plurality of solenoid control valves, a signal for selecting the combination of the plurality of gears corresponding to the changed gear ratio.

* * * * *